United States Patent
Boone

[11] 3,721,333
[45] March 20, 1973

[54] COMBINE GRAIN BIN UNLOADER
[75] Inventor: Jerry C. Boone, Independence, Mo.
[73] Assignee: Allis-Chalmers Corporation, Milwaukee, Wis.
[22] Filed: June 9, 1971
[21] Appl. No.: 151,384

[52] U.S. Cl. ............... 198/119, 198/213, 214/83.32
[51] Int. Cl. .............................................. B65g 41/00
[58] Field of Search .... 198/119, 213; 214/522, 83.32

[56] References Cited

UNITED STATES PATENTS 3,100,052  8/1963  Brembeck ........................ 198/213 X
2,849,137  8/1958  Hansen ............................... 214/522

Primary Examiner—Evon C. Blunk
Assistant Examiner—Hadd S. Lane
Attorney—Kenneth C. McKivett, Charles L. Schwab and Robert B. Benson

[57] ABSTRACT

This disclosure relates to a power operated swingable auger conveyer which can be moved from operative discharge position conveyer at right angles to the vehicle supporting the conveyor to an inoperative discharge wherein the conveyer lies alongside the vehicle.

1 Claim, 6 Drawing Figures

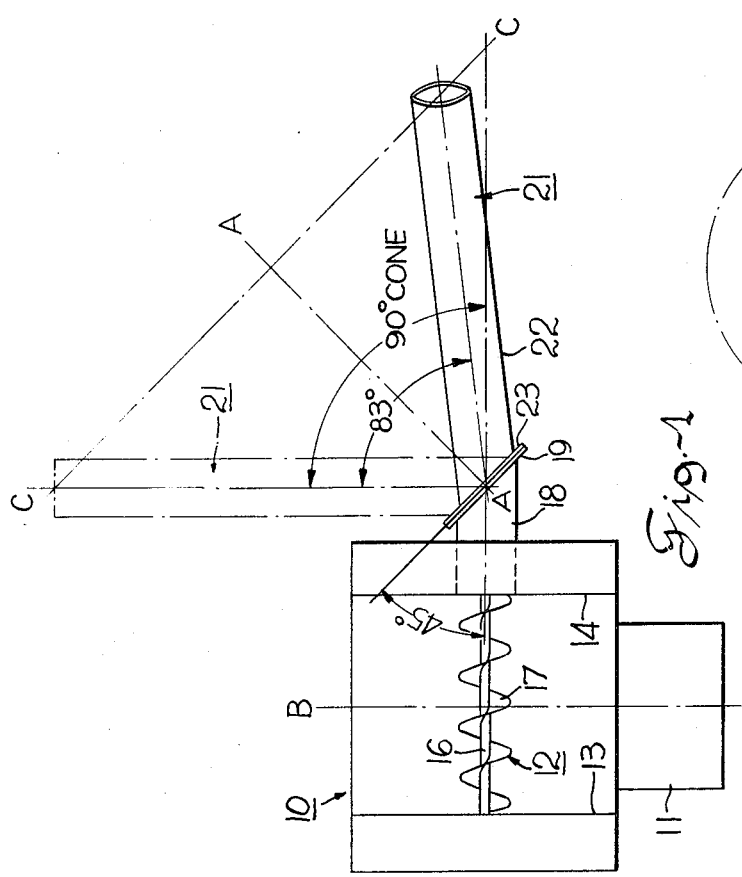
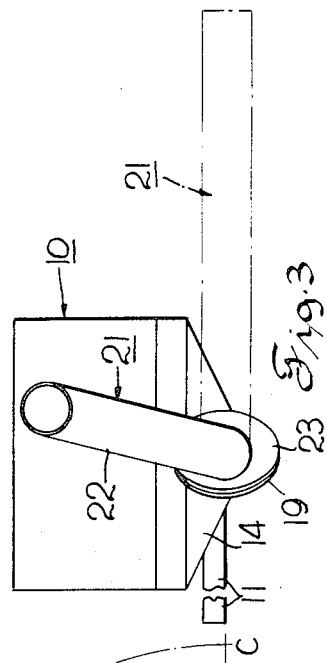
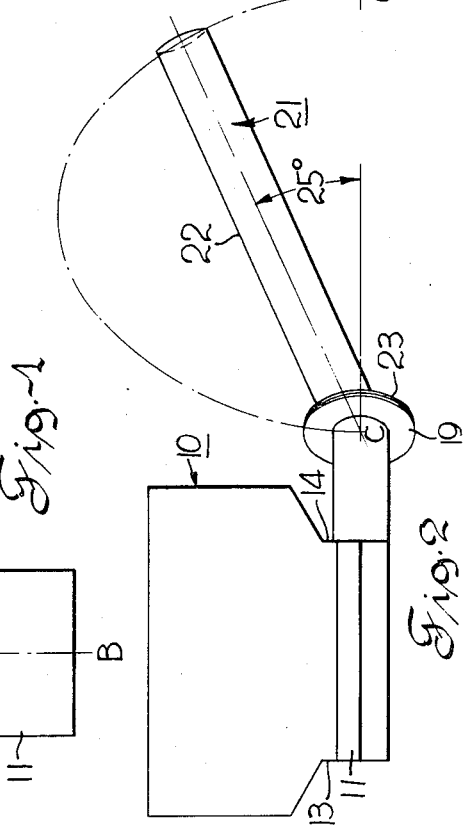

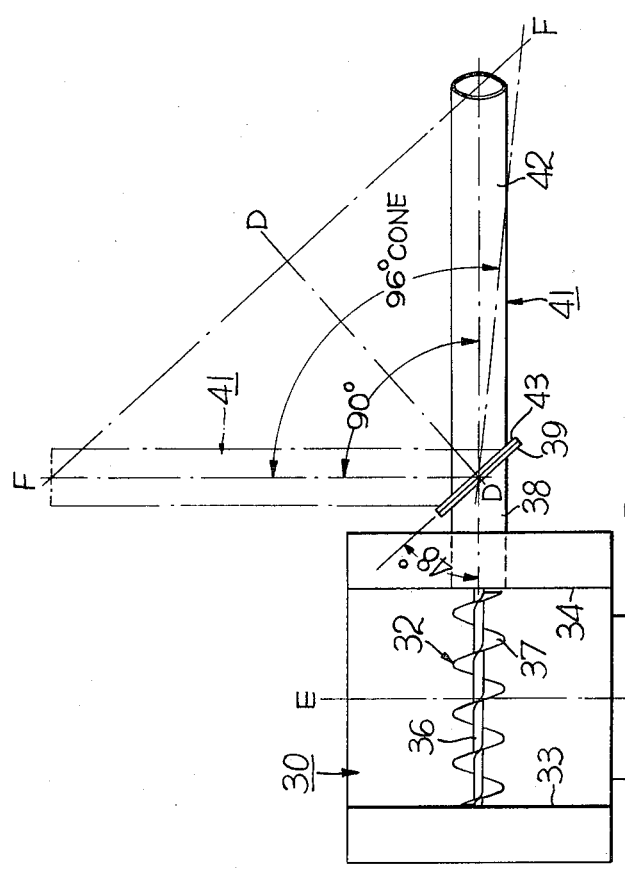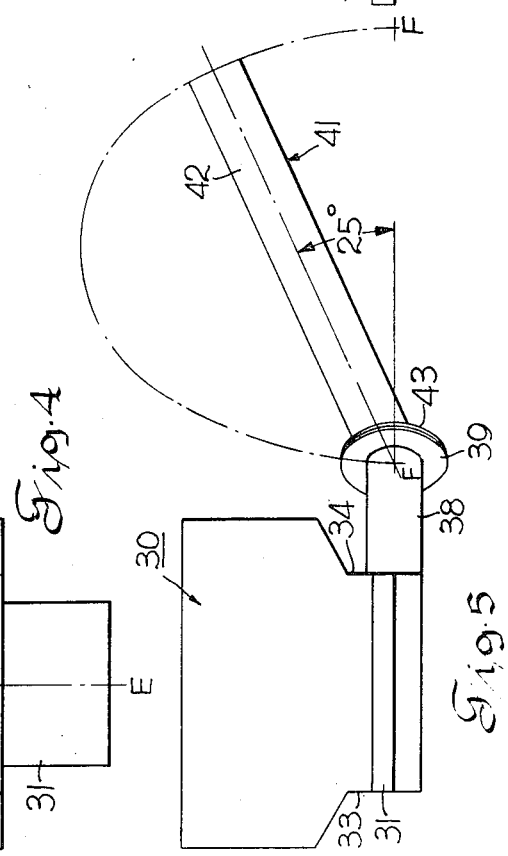

COMBINE GRAIN BIN UNLOADER

This invention relates generally to a combined harvester-thresher and it is concerned more particularly with the provision of an improved auger type conveying system for unloading threshed material from a storage bin which is mounted on and forms part of the harvester.

More specifically this invention is an improvement over the invention shown and described in application Ser. No. 26221, filed Apr. 7, 1970, now U.S. Pat. No. 3,638,812 of Feb. 1, 1972 reference to which may be had for further details. Application Ser. No. 26221 and this application are owned by the same assignee.

In a combine harvester having a bin unloader of the type described in application Ser. No. 26,221, it is shown that the movable section of the unloader tube is designed to travel about a segment of a 90° cone. This would appear to be a logical approach when designing such an unloader. However, this has some disadvantages when the unloader tube is positioned extending upwardly in unloading position. First and most important, the unloader will be extending slightly rearwardly making the discharge end thereof difficult for the operator to observe, and secondly, this odd position detracts from the appearance of the machine.

The improvement herein contemplated lies in the design of the unloader conveyor to circumscribe a segment of a cone whose internal angle is greater than 90° such that when the movable tube of the discharge conveyor is stopped at its predetermined desired slope, in this case 25° with the ground surface, that the tube will then be extending at right angles to the main axis of the combine. Its discharge is then more easily observed by the operator, and the machine presents a more attractive appearance.

The foregoing and other important objects and desirable features in and encompassed by the invention will become apparent from the following detailed description and accompanying sheets of drawings, in which:

FIG. 1 is a plan view of a portion of a combine harvester showing a grain bin unloader of the prior art;

FIG. 2 is a front elevation view of the embodiment shown in FIG. 1;

FIG. 3 is a side elevation view of the embodiment shown in FIG. 1;

FIG. 4 is a plan view similar to FIG. 1 showing an embodiment of the present invention;

FIG. 5 is a front elevation view of the embodiment shown in FIG. 4; and

FIG. 6 is a side elevation view of the embodiment shown in FIG. 4.

Referring to FIG. 1, a grain bin 10 and operator's platform 11 are shown which are adapted to be mounted on a self-propelled harvester (not shown) in the manner shown in copending application Ser. No. 26,221 to which reference may be had if additional details of construction are desired. Operator's platform 11 is mounted on the frame of the combine harvester forward of the grain bin 10.

A transversely extending unloader auger type conveyer 12 is journaled at one end by conventional means (not shown) in a sidewall 13 of grain bin 10. Conveyer 12 extends horizontally just above the floor of bin 10 through sidewall 14 of bin 10. The aforesaid journaled end of conveyer 12 is operatively connected to the engine (not shown) of the combine harvester for being driven by same. Conveyer 12 includes a central shaft 16 upon which auger flighting 17 is mounted. The portion of conveyer 12 which extends outwardly from grain bin wall 14 is enclosed in a tube 18 carried by wall 14. The outer end of tube 18 terminates at approximately a 45° angle facing rearwardly and this outer end of tube 18 is turned over to provide a supporting flange portion 19. Conveyer extension 21 includes a tube portion 22 which has its connected end cut off at approximately a 45° angle facing forwardly and which is provided with a flange 23 connected to flange 19 for pivotal movement relative thereto about axis A—A (by means not shown). Conveyer extension 21 is provided with a central auger shaft having flighting thereon and such shaft has its outer end rotatably supported adjacent the outer end of extension 21 and its inner end is connected to shaft 16 by a universal joint (all of which are not shown). Conveyer extension 21 is adapted to be pivoted about axis A—A from a transport position shown in phantom lines alongside grain bin 10 and parallel to the longitudinal axis B—B of the combine to a position shown in full lines and extending generally transverse to said axis B—B but extending slightly rearwardly so that the operator standing on platform 11 would have some difficulty in seeing exactly where grain discharging from the end of conveyer 21 was landing. In addition, referring to FIG. 1, it is seen that the 83° angle, tube 21 presents to the combine, does not make a pleasing picture.

The movement of tube 21 from the transport position to the grain discharge position in effect generates a segment of a cone having a circular base C—C and an included angle of 90°. This circular base C—C shows up elliptical in FIG. 2 where only the upper half of the cone base is shown. The tube 21 is shown extending upwardly at an angle of 25°. This angle would vary with different combines depending on the length of the tube 21. The amount of clearance desired between the end of tube 21, the ground, and the side of the combine, is usually uniform i.e. sufficient for a large sized truck to drive under tube 21 so that the combine can be unloaded on the go with the discharged grain landing in the middle of the truck.

Now referring to FIG. 4, it is readily seen that an improved design of grain unloader is provided over that shown in FIGS. 1 through 3. A grain bin 30 and operator's platform 31 are shown which are adapted to be mounted on self-propelled harvester (not shown) in the manner utilized in copending application Ser. No. 26,221 to which reference may be had if additional details of construction are desired. Operator's platform 31 is mounted on the frame of the combine harvester forward of the grain bin 30.

A transversely extending unloading auger type conveyer 32 is journaled at one end by conventional means (not shown) in a sidewall 33 of grain bin 30. Conveyer 32 extends horizontally just above the floor of bin 30 through sidewall 34 of bin 30. The aforesaid journaled end of conveyer 32 is operatively connected to the engine of the combine harvester for being driven by same (not shown). Conveyer 32 includes a central shaft 36 upon which auger flighting 37 is mounted. The portion of conveyer 32 which extends outwardly from grain bin wall 34 is enclosed in a tube 38 carried by wall 34. The outer end of tube 38 is cut off at approximately a 48° angle facing rearwardly and this outer end of tube 38 is turned over to provide a supporting flange portion 39. Conveyer extension 41 includes an assembly of a tube portion 42 which has its connected end cut off at approximately a 48° angle facing forwardly and which is provided with a flange 43 connected to flange 39 for pivotal movement relative thereto about axis D—D (by means not shown). Axis D—D emenates from the center of the cutoff portion of tube 38. Conveyer extension 41 is provided with an auger shaft having flighting thereon and such shaft has its outer end rotatably supported adjacent the outer end of extension 41 and its inner end is connected to shaft 36 by a universal joint (all of which are not shown). Conveyer extension 41 is adapted to be pivoted about axis D—D from a transport position shown in phantom lines alongside grain bin 30 and parallel to the longitudinal axis E—E of the combine to a position shown in full lines and extending at right angles to said axis E—E so that the operator standing on platform 31 can see exactly where grain discharging from the end of conveyer 41 is landing. In addition, referring to FIGS. 1 and 4, it is seen that FIG. 4 presents a more attractive appearance than FIG. 1 in that tube 41 in FIG. 4 does not appear to have been bent backwards slightly as the tube 21 in FIG. 1 appears to be.

The movement of tube 41 from the transport position to the grain discharge position in effect generates a segment of a cone having a circular base F—F and an included angle in excess of 90° and as shown in FIG. 4 this included angle is 96°. This circular base F—F shows up elliptical in FIG. 5 where only the upper half of the base is shown. The tube 41 is shown extending upwardly at an angle of 25°. This angle would vary with different combines depending on the length of tube 41. The amount of clearance between the end of tube 41 and the ground is sufficient for a large sized vehicle to drive under tube 41 so that the combine can be unloaded into the center of the vehicle on the go. This naturally demands that the discharge end of tube 41 also be spaced transversely from the harvester a distance sufficient so that this discharge end of tube 41 will overlie the center of the truck or vehicle receiving the conveyed grain. With the combination shown, the proper clearances are achieved when tube 41 is in a discharge position wherein the tube makes a substantially 25° angle with the ground.

If desired, the included angle may be greater than 96° to provide a slightly forward facing discharge end to tube 42 which would place the discharge end in a readily seen position for the operator although this might not be as attractive as the tube assembly extending at right angles to the longitudinal axis of the combine.

The embodiments of the invention in which an exclusive property or privilege is claimed are defined as follows:

1. In a combine harvester having an operator's platform, a grain bin and an auger type grain unloading conveyor positioned adjacent the bottom portion of said bin, the improvement comprising an auger and tube assembly adapted to form an operative extension of said unloading conveyer and positionable in a transport position extending parallel in plan to the longitudinal axis of said harvester and positionable in an unloading position extending at right angles in plan to said harvester, said unloading conveyor including a tube extending from said grain bin and presenting an angled end portion at its outboard end which end portion faces rearwardly, means pivotally mounting said auger and tube assembly on said angled end portion for pivotal movement about an axis passing through the center of said angled end portion so that said auger and tube assembly extend outwardly at substantially right angles in plan to the longitudinal axis of said harvester when in unloading position and the outer end of said tube is provided with ground clearance and side clearance so vehicles can move under the outboard end of said tube for receiving grain in the center of said vehicle, said auger and tube assembly generating a segment of a cone when pivoted from said transport position to said unloading position with the apex of said cone being in the center of said angled end portion, said cone having an included angle of 96°, and said assembly extends upwardly and outwardly from said harvester at approximately an angle of 25° relative to the ground when in unloading position.

* * * * *